US012381364B1

(12) United States Patent
Lu

(10) Patent No.: US 12,381,364 B1
(45) Date of Patent: Aug. 5, 2025

(54) POWER ADAPTER

(71) Applicant: Dahui Lu, Sanming (CN)

(72) Inventor: Dahui Lu, Sanming (CN)

( * ) Notice: Subject to any disclaimer, the term of this patent is extended or adjusted under 35 U.S.C. 154(b) by 0 days.

(21) Appl. No.: 19/010,468

(22) Filed: Jan. 6, 2025

(30) Foreign Application Priority Data

Dec. 2, 2024 (CN) ......................... 202411752201.7

(51) Int. Cl.
*H01R 31/00* (2006.01)
*H01R 13/66* (2006.01)
*H01R 13/72* (2006.01)
*H01R 31/06* (2006.01)

(52) U.S. Cl.
CPC ....... *H01R 31/065* (2013.01); *H01R 13/6675* (2013.01); *H01R 13/72* (2013.01)

(58) Field of Classification Search
CPC ... H01R 31/065; H01R 13/6675; H01R 13/72
See application file for complete search history.

(56) References Cited

U.S. PATENT DOCUMENTS 3,866,109 A * 2/1975 Reed ......................... F02C 9/50 700/282
5,957,090 A * 9/1999 Larson ................. A01K 13/002 15/1.52
6,290,543 B1 * 9/2001 Plummer, Jr. ......... H01R 31/02 439/639
6,325,665 B1 * 12/2001 Chung ................... H02G 11/02 439/501
6,623,294 B2 * 9/2003 Tse ......................... H01R 13/72 439/4
6,641,412 B2 * 11/2003 Kitagawa ............... H01R 35/04 439/131
7,618,292 B1 * 11/2009 Lin ........................ H01R 35/04 439/640
8,052,441 B2 * 11/2011 Senatori ............. H01R 13/6675 439/171
8,123,552 B2 * 2/2012 Hsu ...................... H05K 5/0278 439/501
8,585,419 B2 * 11/2013 Byrne .................. H01R 13/652 439/211
8,771,005 B2 * 7/2014 Tracey ................... B65H 75/40 439/445
9,673,557 B1 * 6/2017 Barnard ................. H01R 31/06

* cited by examiner

*Primary Examiner* — Phuong Chi Thi Nguyen
(74) *Attorney, Agent, or Firm* — Westbridge IP LLC

(57) ABSTRACT

A power adapter includes a housing and a circuit board arranged in the housing. One side of the housing is provided with a charging plug electrically connected with the circuit board; at least two telescopic assemblies are also arranged in the housing; the telescopic assemblies are used for telescopic storage of charging cables, and the charging cables are electrically connected with the circuit board. The other side of the housing is provided with a first through hole and at least one second through hole; the charging cable of one telescopic assembly extends out of the housing from the first through hole and is electrically connected with a wireless charging unit; and the charging cable of at least one telescopic assembly extends out of the housing from the second through hole and is electrically connected with a charging connector.

10 Claims, 7 Drawing Sheets

POWER ADAPTER

CROSS-REFERENCE TO RELATED APPLICATIONS

This application claims priority to Chinese Patent Application No. 202411752201.7, filed on Dec. 2, 2024, the content of which is incorporated herein by reference in its entirety.

TECHNICAL FIELD

The present application relates to the technical field of chargers, in particular to a power adapter.

BACKGROUND

The power adapter is a power supply change device of small portable electronic devices and electronic and electrical appliances. With the development of electronic science and technology and the improvement of social living standards, the application of electronic products has become more and more extensive. When traveling or going out to study, it is usually necessary to carry a plurality of electronic devices. These electronic devices need to be charged through the power adapter. Different electronic devices have different charging interfaces, and electronic devices such as smart watches can only be charged through wireless chargers.

There are two common types of power adapters on the market: the first type of power adapter is a power adapter that is only provided with a plug to serve as a plug. When this type of power adapter is used, users need to carry an additional charging cable or wireless charging module adapted with the electronic devices. The second type of power adapter is the integrated design of a plug and a charging cable. When the charging port types of different electronic devices of the users are different, the users need to carry a plurality of power adapters, and this type of power adapter is usually unable to achieve a wireless charging function.

In addition, the output power of the existing power adapter cannot be adjusted according to the number of electronic devices connected thereto, which makes it difficult for the existing power adapter to charge and supply a plurality of electronic devices at the same time while ensuring the electricity safety.

In addition, at present, there are some power adapters that use telescopic assemblies to curl the charging cables, but this type of power adapter is usually provided with a single telescopic assembly and usually uses a single charging cable, because one end of the charging cable having a charging connector needs to be controlled to penetrate through a housing of the power adapter after the telescopic assembly is assembled. A through hole through which the charging connector penetrates shall be reserved on the housing. The size of the charging connector is usually large, and the size of the reserved through hole will be large. Once a plurality of telescopic assemblies are integrated in the housing of the power adapter, a plurality of through holes shall be reserved on the housing, which eventually lead to a very large size and thickness of the housing of the entire power adapter, which is not conducive to use and carrying of the users.

SUMMARY

A technical problem to be solved in the present application is to provide a new power adapter to solve the problem of inconvenient use of the existing power adapter.

In order to solve the above technical problem, a technical solution adopted in the present application is: A power adapter includes a housing and a circuit board arranged in the housing; one side of the housing is provided with a charging plug electrically connected with the circuit board; at least two telescopic assemblies are also arranged in the housing; the telescopic assemblies are used for telescopic storage of charging cables, and the charging cables are electrically connected with the circuit board, wherein the other side of the housing is provided with a first through hole and at least one second through hole; the charging cable of one telescopic assembly extends out of the housing from the first through hole and is electrically connected with a wireless charging unit; and the charging cable of at least one telescopic assembly extends out of the housing from the second through hole and is electrically connected with a charging connector.

In the above technical solution of the present application, with respect to the problems that the common power adapter in the current market cannot meet the charging needs of different devices to be charged, and is inconvenient for users to charge, the present application designs a new power adapter. The power adapter can realize wired charging and wireless charging at the same time, and the charging connector used for wired charging can adopt a suitable connector type according to the actual use needs, so as to meet the diverse charging needs of the users.

Based on the above design, in practical application, the power adapter can be in the form of a telescopic cable, which is convenient for the user to stretch the charging cable, so as to realize wired charging of one device to be charged through the use of the charging connector, and simultaneous wireless charging of another device to be charged through a wireless charging unit.

It can be seen that by using the power adapter designed in the present application, the user does not need to carry a plurality of power adapters, which can greatly simplify the charging operation of the user, meets the diverse charging needs of the user in daily life, and has good promotion prospects and application value.

Further, the power adapter in the present application also includes a clamping plate; the clamping plate is clamped in the second through holes; one side of the clamping plate is provided with an avoidance groove; the avoidance groove and inner walls of the second through holes are enclosed to form a cable outlet hole; and the charging cable extends out of the housing from the cable outlet hole.

The research has found that once the existing power adapter is provided with a plurality of telescopic assemblies, because the telescopic assemblies need to control one end of the charging cable with the charging connector to penetrate through the housing of the power adapter after assembly, and the size of the charging connector is usually large, a plurality of large-size through holes through which the charging connector penetrates need to be reserved on the housing. Finally, the size and the thickness of the housing of the entire power adapter is caused to be very large, which is not conducive to use and carrying of the users.

Therefore, in the present application, a clamping plate that can be detachably connected with the housing is subjected to optimization design. The clamping plate can be specifically arranged in the second through holes, and one side of the clamping plate can be enclosed with the inner walls of the second through holes to form the cable outlet hole. Based on this design, when the telescopic assemblies are arranged in the housing, the clamping plate can be not installed at this time; one end of the telescopic cable carrying the charging connector can directly penetrate through the second through hole of a large size; and then the clamping plate is covered to ensure the normal entry and exit of the charging cable based on the above cable outlet hole.

For example: a connector seat of the existing charging connector is usually a flat connector seat (as shown in FIG. 1 and FIG. 4), which is generally rectangular. Once the existing power adapter is provided with a plurality of telescopic assemblies, the width size and the length size of each through hole arranged on the housing of the power adapter should be larger than the size of the flat connector seat, so that the flat connector seat can penetrate through the housing in a horizontal state opposite to the through hole. The arrangement of such a large-size through hole will inevitably lead to the difficulty in reducing the size of the housing.

The second through hole is reserved in advance on the housing used in the present application. The width size of the second through hole is small, which is smaller than the width size of the flat connector seat. The length size of the second through hole is large. The flat connector seat can penetrate through the housing in a vertical state (in the vertical state, only the second through hole needs to meet the length size and the thickness size of the flat connector seat) opposite to the second through hole, and then the clamping plate is installed to reduce the size of the cable outlet hole through the clamping plate. At this moment, the width size of the cable outlet hole is consistent with the width size of the second through hole, and the length size of the cable outlet hole is less than the length size of the flat connector seat.

Therefore, based on the arrangement of the clamping plate, the problem of large size of the housing when the power adapter is provided with a plurality of telescopic assemblies can be solved, which can reduce the volume size of the housing by 50% to a certain extent, so as to facilitate the carrying and use of the users.

Further, in the power adapter of the present application, an outer circumferential surface of one end of the charging cable extending from the housing is provided with a protruding stopper.

In the above technical solution, the stopper is used to limit and block the retracting stroke of the charging cable in the retracting process of the charging cable, so that the charging cable may not be further retracted due to the telescopic assembly when retracted to a preset size, so as to facilitate subsequent storage and use.

Further, in the power adapter of the present application, a magnetic element is arranged on an inner side surface of the clamping plate near the interior of the housing; the charging connector is sleeved with a metal shell; and the magnetic element is used to adsorb the metal shell on the charging connector.

In the above technical solution, the housing of the existing power adapter is usually formed by integrated injection molding. The magnetic element can be arranged on the inner wall of the housing only after the telescopic assemblies in the housing are installed and the extending length of the charging cable is determined. However, at this time, many components and parts are arranged in the housing. The internal structure is compact, and the space is narrow. Generally, only the manual installation means can be used, which consumes a lot of manpower for assembly, and because of high difficulty of assembly, in the long-term use process, it is extremely easy to generate the problems of improper installation of the magnetic element and falling after installation, thereby resulting in subsequent rework and affecting production efficiency.

Different from the existing power adapter products, the power adapter designed in the present application is provided with the clamping plate. The clamping plate can be buckled on the housing. Manufacturers can directly assemble the magnetic element on the inner side surface of the clamping plate near the interior of the housing in the form of manual assembly or automatic assembly. The installation difficulty is low, the production efficiency is high, and the production failure rate can be greatly reduced.

Further, in the power adapter of the present application, the clamping plate includes a first vertical part, a horizontal part, a bending part and a second vertical part connected successively; the first vertical part and the second vertical part extend along a first direction; the horizontal part extends along a second direction perpendicular to the first direction; wherein the second vertical part is provided with an avoidance groove extending along the second direction and penetrating through the second vertical part; and an inner side surface of the first vertical part near the housing is provided with a buckle element.

Further, in the power adapter of the present application, at least two telescopic assemblies are laminated sequentially along the thickness direction of the housing; a limiting groove is arranged in the housing; the telescopic assemblies are arranged in the limiting groove; a side wall of the limiting groove is provided with a positioning convex block extending along the thickness direction of the housing; and outer walls of the telescopic assemblies are provided with positioning grooves matched with the positioning convex block.

In the above technical solution, considering the possible danger that the power adapter may become loose from a power socket and fall to the ground in the actual use process of the user, to improve the reliability and the durability of the power adapter, in practical application, the positioning convex block can also be arranged on the limiting groove of the housing, and the positioning grooves are arranged on the outer walls of the telescopic assemblies, so as to strengthen the installation stability of the telescopic assemblies in the housing based on a matching relationship between the positioning convex block and the positioning grooves, avoid the displacement caused by extreme collision and prevent the influence on subsequent normal use of the users.

Further, in the power adapter of the present application, the other side of the housing is provided with a first accommodating groove and second accommodating grooves arranged in one by one correspondence to the second through holes; the wireless charging unit is arranged in the first accommodating groove; and the charging connector is arranged in the second accommodating grooves.

In the above technical solution of the present application, in the practical application process, when there is no need to charge, the charging cable extending from the first through hole or the second through holes and the connected components can be correspondingly arranged in the first accommodating groove and the second accommodating grooves to improve the storage effect and facilitate subsequent reuse.

It should be pointed out that in practical application, the first accommodating groove can be specifically selected from a notch shape matched with the shape of the wireless charging unit, such as: a circular groove. The second accommodating groove can also be specifically selected from a notch shape matched with the shape of the charging connector, such as a rectangular groove. Wherein when the first accommodating groove and the second accommodating grooves are arranged, a spherical edge can also be arranged on the edges of the ports of the first accommodating groove and the second accommodating grooves, so that the finger of the user can easily extend from the spherical edge into the first accommodating groove or the second accommodating grooves, so as to facilitate the taking and placing of the required charging connector or wireless charging unit.

Further, in the power adapter of the present application, a first telescopic assembly, a second telescopic assembly and a third telescopic assembly are arranged in the housing, and the housing is provided with a first through hole and two second through holes; wherein the charging cable of the first telescopic assembly extends out of the housing from the first through hole and is electrically connected with the wireless charging unit; the charging cable of the second telescopic assembly extends out of the housing from the second through hole and is electrically connected with a type-C charging connector; and the charging cable of the third telescopic assembly extends out of the housing from the other second through hole and is electrically connected with a Lightning charging connector.

Further, in the power adapter of the present application, the circuit board is provided with a micro controller unit (MCU); a charging protocol storage module is arranged in the MCU; and a plurality of fast charging protocols are stored in the charging protocol storage module; wherein when the charging connector is connected with a device to be charged, the MCU responds and obtains a fast charging type of the device to be charged, and invokes the corresponding fast charging protocol from the charging protocol storage module according to the fast charging type to quickly charge the device to be charged.

In the above technical solution of the present application, considering the possible fast charging need of the device to be charged of the user, the use experience of the user is improved. In practical application, the charging protocol storage module can also be arranged in the MCU to pre-store a plurality of fast charging protocols in the charging protocol storage module. In practical charging, the corresponding fast charging type is identified and obtained, and the corresponding fast charging protocol is invoked from the charging protocol storage module to quickly charge the device to be charged.

It should be added that in practical application, the above fast charging protocols stored in the charging protocol storage module can include at least one of the following: QC fast charging protocol, PD fast charging protocol, FCP fast charging protocol, AFC fast charging protocol, SFCP fast charging protocol, APPLE fast charging protocol and SUNSUMG fast charging protocol.

Further, in the power adapter of the present application, the MCU is used to control the charging power of the charging connector according to the use state of the wireless charging unit and the charging connector; wherein when only the single charging connector is used for charging, the charging power of the charging connector is 30 W.

In the above technical solution of the present application, the power adapter can provide real-time judgment of the use condition of the current wireless charging unit and the charging connector for the MCU on the circuit board, and allocate the output power of each power supply end according to the specific use condition.

For example, three telescopic assemblies are arranged in the power adapter, and the charging cable of one telescopic assembly extends out of the housing from the first through hole and is electrically connected with the wireless charging unit; and the charging cables of the other two telescopic assemblies extend out of the housing from two different second through holes respectively and are electrically connected with the charging connector.

At this time, when the power adapter is used for charging, the following power supply control can be conducted according to the use condition.

(1) When the user only uses the wireless charging unit for charging, the MCU detects that the wireless charging unit works and can specifically control the wireless charging unit to output a constant power of 3 W, that is, output voltage is 5 V and output current is 0.6 A.

(2) When any one of the charging connectors works, the MCU detects that a single charging connector works and the charging connector can output a constant power of 30 W to facilitate the user to quickly charge devices such as a laptop.

(3) When the user uses the wireless charging unit with one charging connector to work at the same time, the MCU detects that one wireless charging unit and one charging connector work, and they can output a constant power of 33 W. At this time, the output voltage of the wireless charging unit is 5 V, the output current is 0.6 A, and the output power is 3 W; and the power output of the charging connector is 30 W.

(4) When the user uses two charging connectors to work at the same time, the MCU detects that the two charging connectors work, and the charging connectors can output a constant power of 15 W. At this time, the output voltage of the two charging connectors is 5 V, the output current is 3 A.

(5) When the user uses the wireless charging unit with two charging connectors to work at the same time, the MCU detects that one wireless charging unit and two charging connectors work, and they can output a constant power of 15.5 W. At this time, the output voltage of the wireless charging unit is 5 V, the output current is 0.6 A, and the output power is 3 W; and the output voltage of the two charging connectors is 5 V and output current is 2.5 A.

It should be noted that the existing power adapter designed with a plurality of charging cables does not have the power distribution problem of the power adapter of the present application, and the output power of each charging cable is constant and low. The power adapter designed in the present application can reasonably adjust the power distribution, which can greatly improve the use safety of the power adapter, and when the single charging connector is used for charging, the charging power of the charging connector can be controlled to reach 30 W to meet the high-power charging need for the devices such as the laptop.

The beneficial effects of the present application are as follows. The present application designs a new power adapter which can integrate a plurality of telescopic assemblies at the same time to conduct telescopic storage of the charging cables based on the telescopic assemblies, so that the charging cables arranged on the plurality of telescopic assemblies can be used to charge the assemblies to be charged. The user can stretch the charging cables, so as to simultaneously realize the wired charging of a device to be charged by using the charging connector and the wireless charging of another device to be charged through the wireless charging unit. For example, the user can plug the power adapter into a power seat, pull out a charging cable that extends from the first through hole to extend the extension size of the charging cable, and places a smart watch on the wireless charging unit connected with the charging cable for charging. At the same time, the user can pull out another charging cable that extends from the second through hole to plug and charge a mobile phone and the charging connector connected by the charging cable, which can greatly meet the diverse charging needs of the user in daily life, and realize good promotion prospects and application value.

DETAILED DESCRIPTION OF THE EMBODIMENTS

Figure 1:
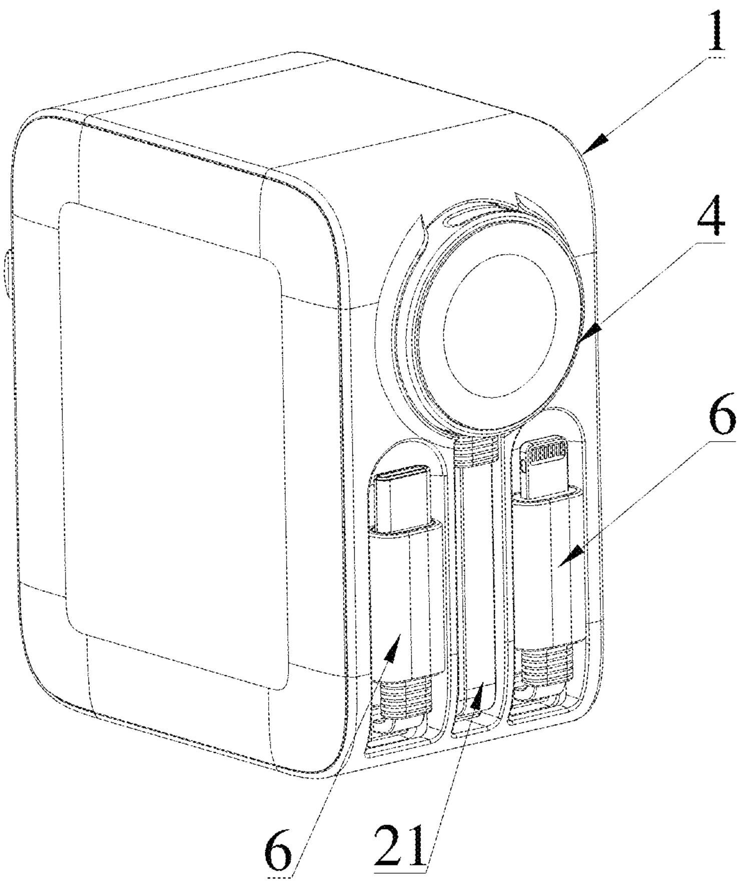
FIG. 1 is a structural schematic diagram of a power adapter of the present application from an angle in one embodiment.

To explain the technical content, achieved purposes and effects of the present application in detail, the present application is illustrated below in combination with the embodiments and the drawings.

As shown in FIG. 1-FIG. 9, in the present embodiment, the present application designs a new power adapter which includes a housing 1 and a circuit board 13 arranged in the housing 1; one side of the housing 1 is provided with a charging plug 3 electrically connected with the circuit board 13; one side of the housing 1 is specifically provided with a third accommodating groove 18; a charging plug 3 is rotatably arranged in the third accommodating groove 18; and the charging plug 3 is electrically connected with the circuit board 13 to supply power to the circuit board 13.

In the present application, considering the problem of storage inconvenience of charging cables 21 of a power adapter with fixed cable length in practical application, telescopic assemblies 2 are specifically arranged in the housing 1 of the power adapter. The telescopic assemblies 2 are used for telescopic storage of the charging cables 21, and the charging cables 21 are electrically connected with the circuit board 13. One end of the charging cables 21 can extend from the housing 1 and are electrically connected with a wireless charging unit 4 or a charging connector 6. Wherein the telescopic assemblies 2 are the contents that can be clarified by those skilled in the art based on the existing technical solution, and will not be repeated here.

Figure 3:
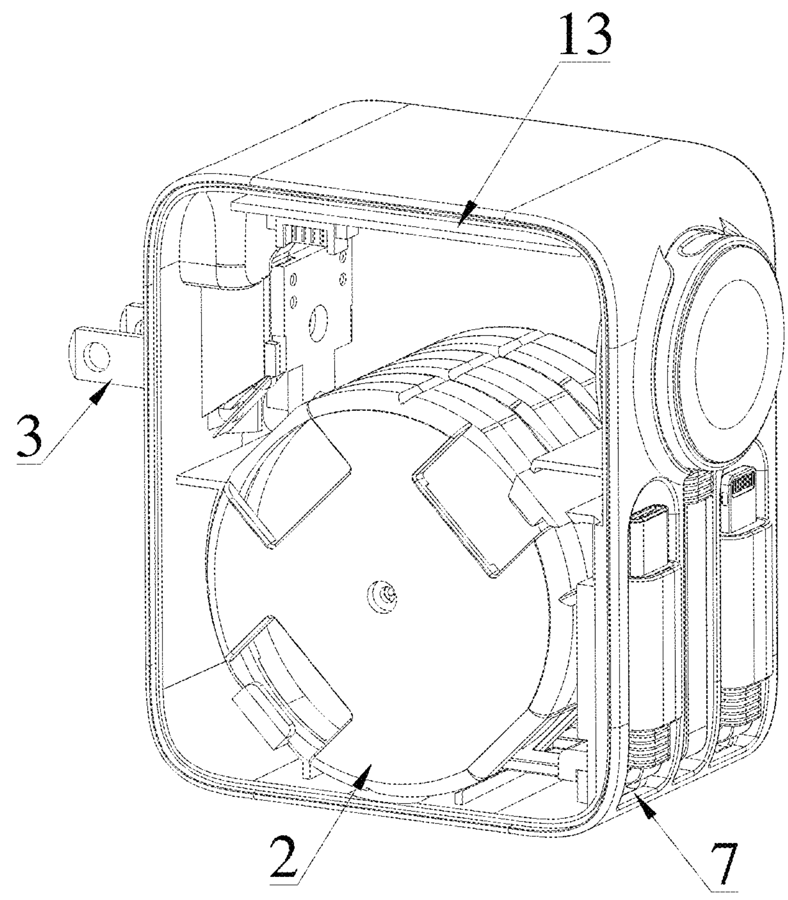
FIG. 3 is a structural schematic diagram of a power adapter of the present application after part of a cover plate of a housing is removed in one embodiment.

It should be noted that, as shown in FIG. 3, in the present embodiment, three telescopic assemblies 2 are specifically arranged in the housing 1, namely, the first telescopic assembly, the second telescopic assembly and the third telescopic assembly. The three telescopic assemblies 2 are successively laminated along the thickness direction of the housing 1; a limiting groove 14 is arranged in the housing 1; the above three telescopic assemblies 2 are arranged in the limiting groove 14; a side wall of the limiting groove 14 is provided with a positioning convex block 15 extending along the thickness direction of the housing 1; and outer walls of the telescopic assemblies 2 are provided with positioning grooves 22 matched with the positioning convex block 15, so as to strengthen the installation stability of the telescopic assemblies 2 in the housing 1 based on a matching relationship between the positioning convex block 15 and the positioning grooves 22, avoid the displacement caused by extreme collision and prevent the influence on subsequent normal use of the users.

Figure 2:
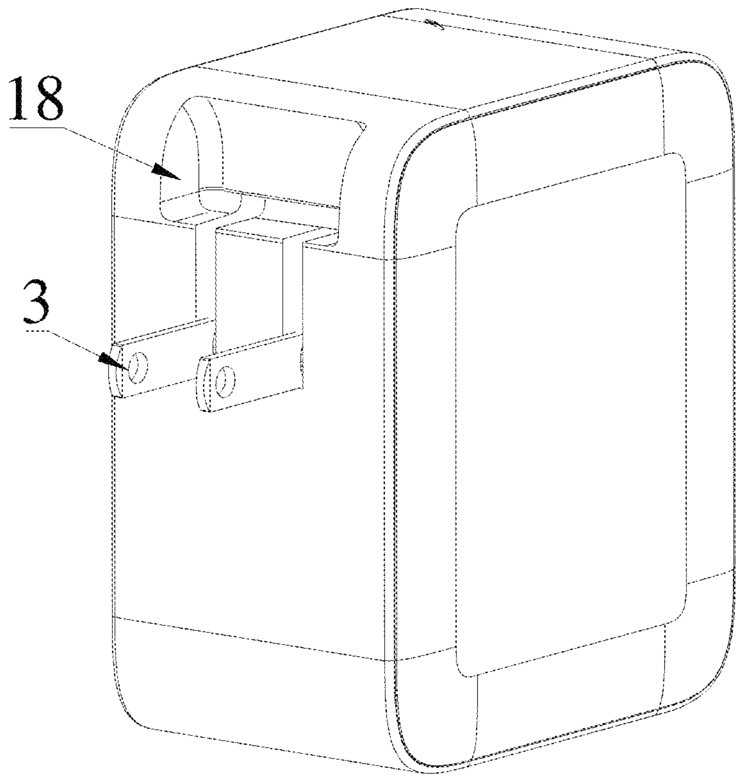
FIG. 2 is a structural schematic diagram of a power adapter of the present application from another angle in one embodiment.
Figure 6:
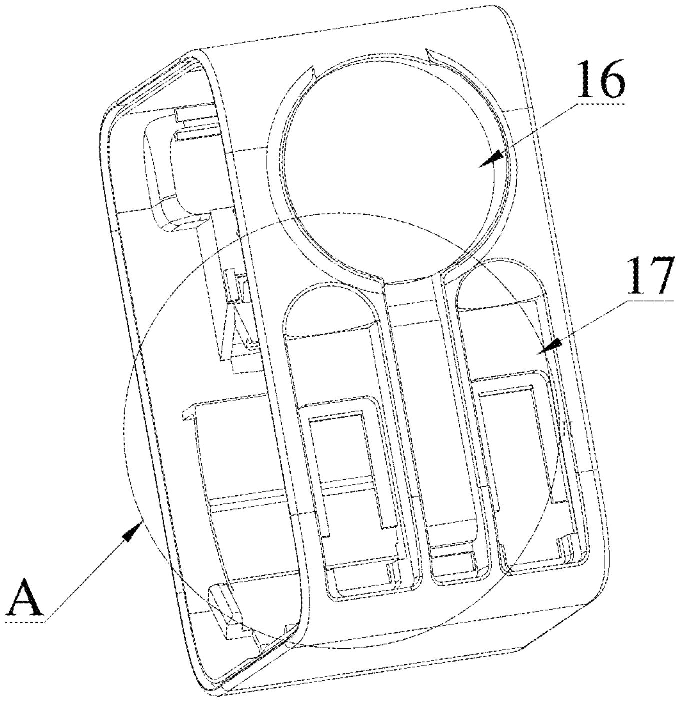
FIG. 6 is a structural schematic diagram of a power adapter of the present application from another angle of a housing in one embodiment.
Figure 7:
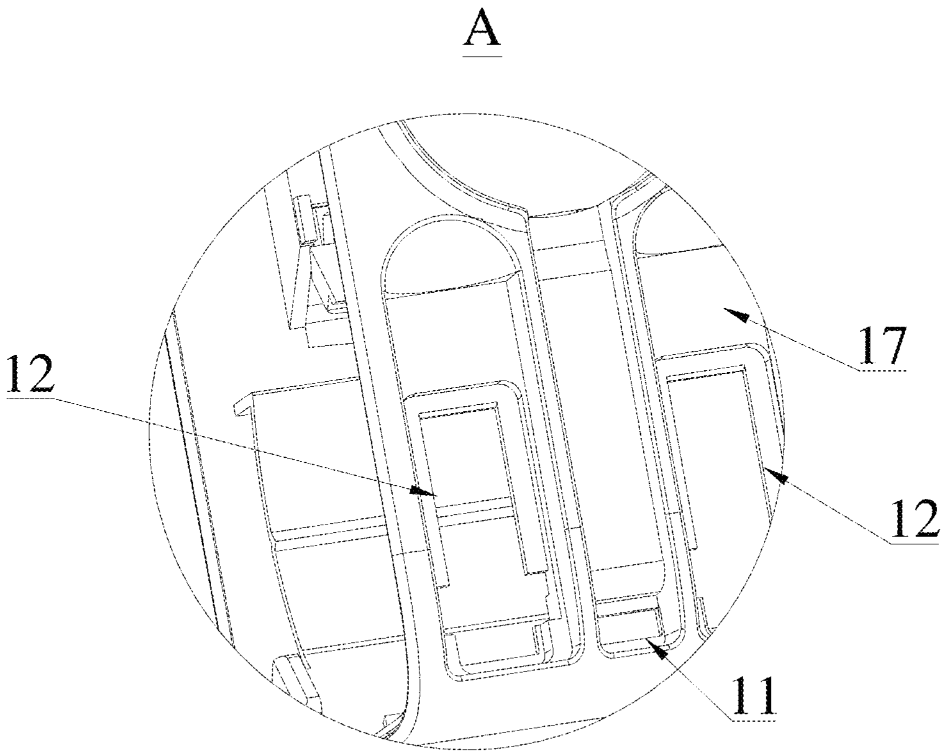
FIG. 7 is a partial enlarged diagram of A of a power adapter shown in FIG. 6 in one embodiment.

Accordingly, as shown in FIG. 1, FIG. 2, and FIG. 6, in the present embodiment, a first through hole 11 and another second through hole 12 are arranged on the other side of the housing 1, and the sequence of arrangement along the thickness direction of the housing 1 is successively: the second through hole 12, the first through hole 11, and the second through hole 12.

In the present embodiment, the charging cable 21 of the first telescopic assembly can extend out of the housing 1 from the first through hole 11 and is electrically connected with the wireless charging unit 4; the charging cable 21 of the second telescopic assembly extends out of the housing 1 from the second through hole 12 and is electrically connected with a type-C charging connector 6; and the charging cable 21 of the third telescopic assembly extends out of the housing 1 from the other second through hole 12 and is electrically connected with a Lightning charging connector 6.

It can be seen that the power adapter designed in the present application can realize wired charging and wireless charging at the same time, and the charging connector 6 used for wired charging can adopt a suitable connector form according to the actual use needs to meet the diverse charging needs of the users. In practical application, the power adapter can be in the form of a telescopic cable, which is convenient for the users to stretch the charging cables 21, so that the charging connector 6 can be used for wired charging of one or more devices to be charged, and simultaneously the wireless charging unit 4 can be used for wireless charging of a device to be charged.

Accordingly, the applicant has found from the research that once the existing power adapter is provided with a plurality of telescopic assemblies 2, there will be a problem that the size and the thickness of the housing 1 of the entire power adapter are very large.

Figure 8:
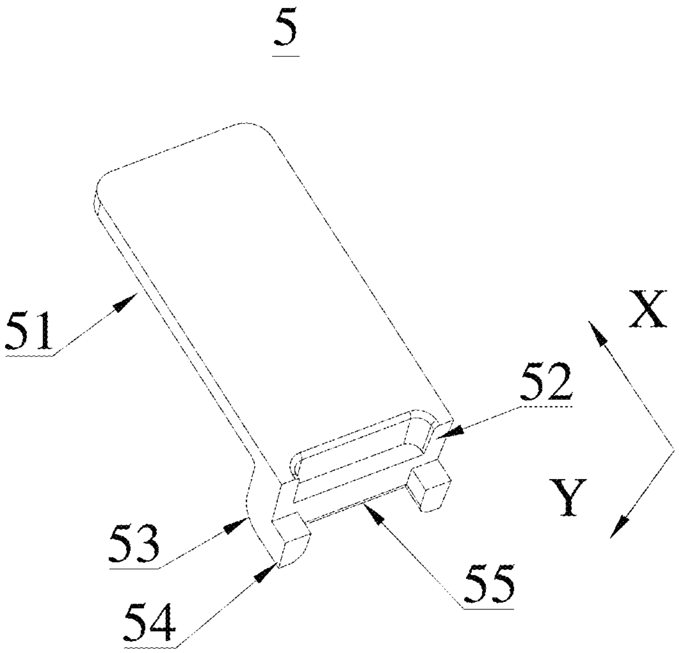
FIG. 8 is a structural schematic diagram of a clamping plate of a power adapter of the present application from an angle in one embodiment.

Therefore, as shown in FIG. 1 and FIG. 8, in the present application, a clamping plate 5 that can be detachably connected with the housing 1 is subjected to optimization design. The clamping plate 5 can be specifically clamped in the second through holes 12, and one side of the clamping plate 5 is provided with an avoidance groove 55. The avoidance groove 55 is enclosed with the inner walls of the second through holes 12 to form a cable outlet hole 7 so that the charging cable 21 can extend out of the housing 1 of the power adapter from the cable outlet hole 7. Based on this design, when the telescopic assemblies 2 are arranged in the housing 1, the clamping plate 5 can be not installed at this time; one end of the telescopic cable carrying the charging connector 6 can directly penetrate through the second through hole 12 of a large size; and then the clamping plate 5 is covered to ensure the normal entry and exit of the charging cable 21 based on the above cable outlet hole 7.

For example: a connector seat of the existing charging connector 6 is usually a flat connector seat, which is generally rectangular. Once the existing power adapter is provided with a plurality of telescopic assemblies 2, the width size and the length size of each through hole arranged on the housing 1 of the power adapter should be larger than the size of the flat connector seat, so that the flat connector seat can penetrate through the housing 1 in a horizontal state opposite to the through hole. The arrangement of such a large-size through hole will inevitably lead to the difficulty in reducing the size of the housing 1.

The second through hole 12 is reserved in advance on the housing 1 used in the present application. The width size of the second through hole 12 is small, which is smaller than the width size of the flat connector seat. The length size of the second through hole 12 is large. The flat connector seat can penetrate through the housing 1 in a vertical state (in the vertical state, only the second through hole 12 needs to meet the length size and the thickness size of the flat connector seat) opposite to the second through hole 12, and then the clamping plate 5 is installed to reduce the size of the cable outlet hole 7 through the clamping plate 5. At this moment, the width size of the cable outlet hole 7 is consistent with the width size of the second through hole 12, and the length size of the cable outlet hole 7 is less than the length size of the flat connector seat.

Therefore, based on the arrangement of the clamping plate 5, the problem of large size of the housing 1 when the power adapter is provided with a plurality of telescopic assemblies 2 can be effectively solved, which can reduce the volume size of the housing 1 by 50% to a certain extent, so as to facilitate the carrying and use of the users.

Figure 4:
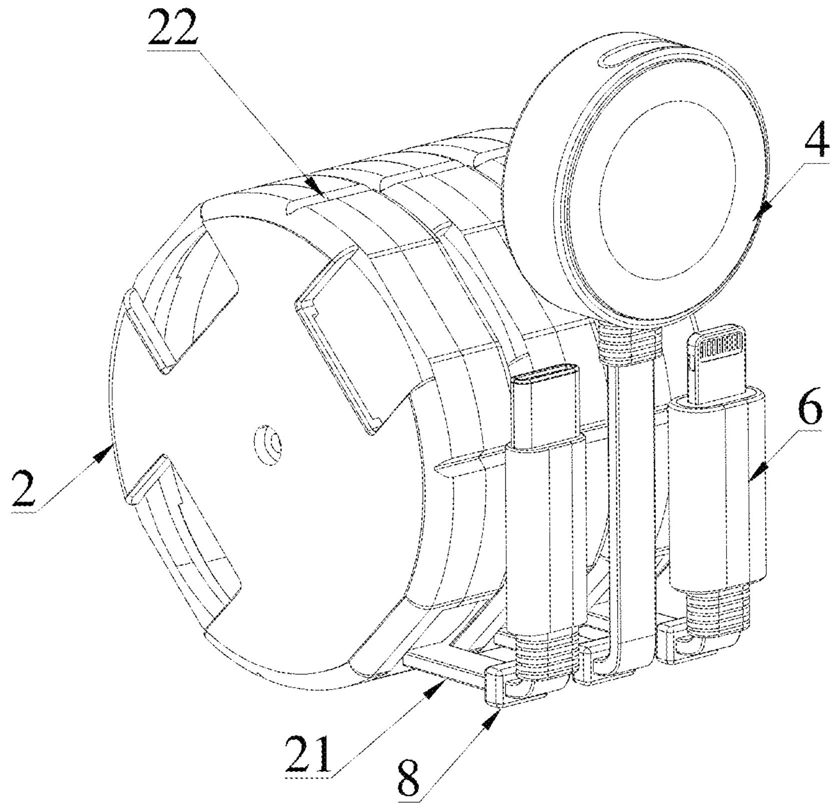
FIG. 4 is a structural schematic diagram of a telescopic assembly of a power adapter of the present application in one embodiment.

Accordingly, as shown in FIG. 4, in order to facilitate the use of the users in practical application, in the present embodiment, an outer circumferential surface of one end of the charging cable 21 of the three telescopic assembly 2 extending from the housing is provided with a protruding stopper 8. The stopper 8 is used to limit and block the retracting stroke of the charging cable 21 in the retracting process of the charging cable 21, so that the charging cable 21 may not be further retracted due to the telescopic assembly 2 when retracted to a preset size, so as to facilitate subsequent storage and use.

Figure 9:
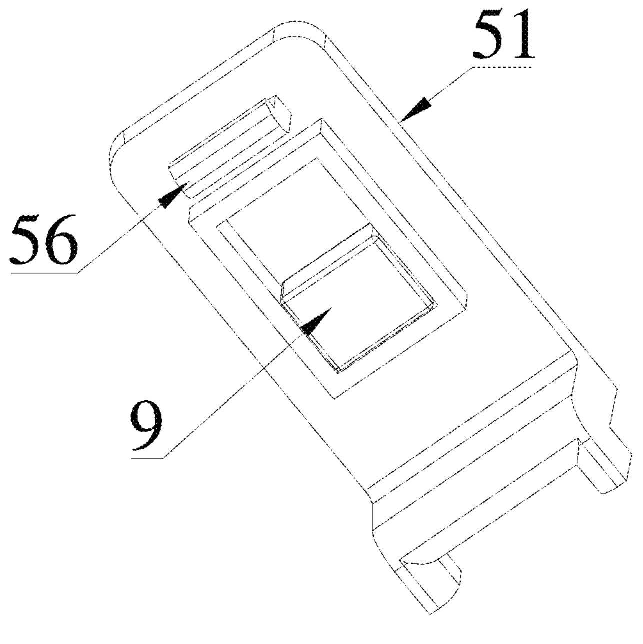
FIG. 9 is a structural schematic diagram of a clamping plate of a power adapter of the present application from another angle in one embodiment.

As shown in FIG. 8 and FIG. 9, in the present embodiment, a magnetic element 9 is arranged on an inner side surface of the power adapter near the interior of the housing 1; the charging connector 6 is sleeved with a metal shell; and the magnetic element 9 is used to adsorb the metal shell on the charging connector 6. Wherein in the present embodiment, the clamping plate 5 includes a first vertical part 51, a horizontal part 52, a bending part 53 and a second vertical part 54 connected successively; the first vertical part 51 and the second vertical part 54 extend along a first direction (X direction shown in FIG. 8); the horizontal part 52 extends along a second direction (Y direction shown in FIG. 8) perpendicular to the first direction; wherein the second vertical part 54 is provided with an avoidance groove 55 extending along the second direction and penetrating through the second vertical part 54; and an inner side surface of the first vertical part 51 near the housing 1 is provided with a buckle element 56. The clamping plate 5 is overlapped and matched with the inner wall of the housing 1 based on the second vertical part 54, and is buckled with the second through hole 12 of the housing 1 by the buckle element 56. In order to avoid the charging cable 21, the second vertical part 54 is also provided with the avoidance groove 55 to improve the cable outlet effect, so that the cable outlet process is more smooth and unhindered.

Accordingly, in the present embodiment, in order to facilitate the holding of the charging connector 6 and the wireless charging unit 4, in the power adapter, the other side of the housing 1 is provided with a first accommodating groove 16 and second accommodating grooves 17 arranged in one by one correspondence to the second through holes 12; the wireless charging unit 4 is arranged in the first accommodating groove 16; and the charging connector 6 is arranged in the second accommodating grooves 17. Wherein when there is no need to charge, the charging cable 21 extending from the first through hole 11 or the second through holes 12 and the connected components can be correspondingly arranged in the first accommodating groove 16 and the second accommodating grooves 17 to improve the storage effect and facilitate subsequent reuse.

Figure 5:
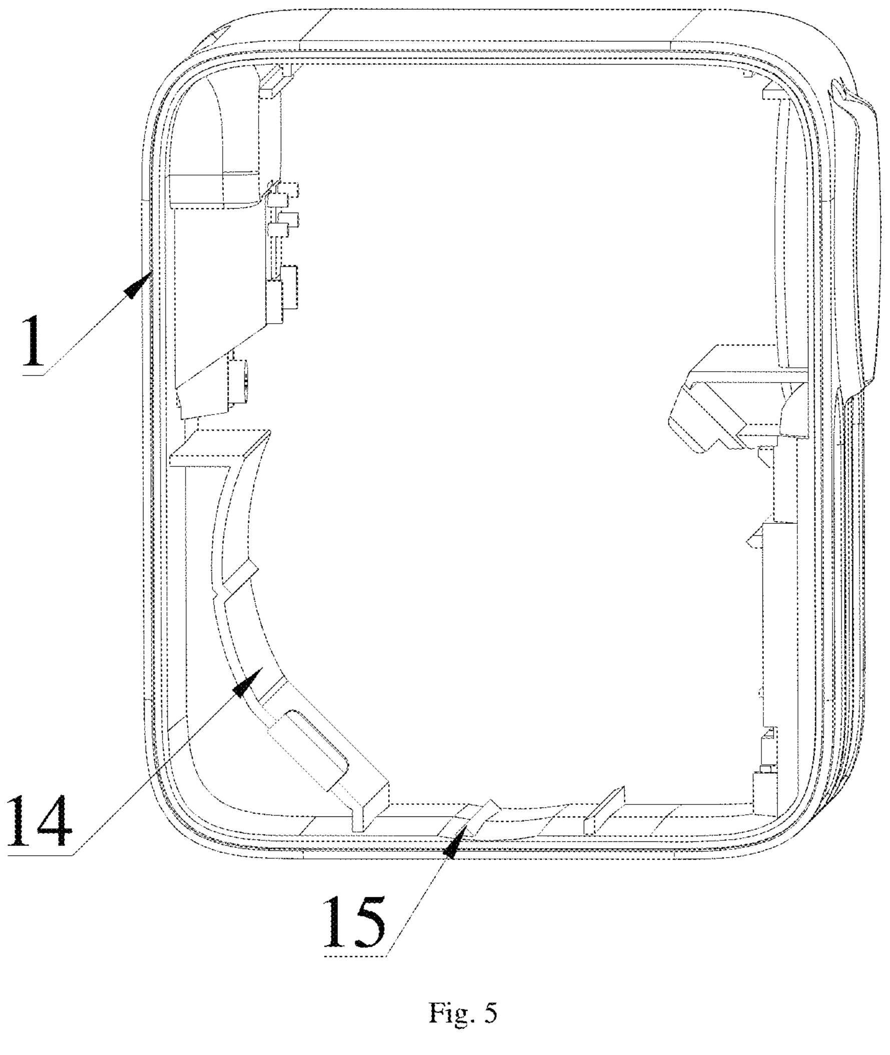
FIG. 5 is a structural schematic diagram of a power adapter of the present application from an angle of a housing in one embodiment.

It should be pointed out that, as shown in FIG. 5 and FIG. 6, in practical application, the first accommodating groove 16 can be specifically selected from a notch shape matched with the shape of the wireless charging unit 4, such as: a circular groove. The second accommodating groove 17 can also be specifically selected from a notch shape matched with the shape of the charging connector 6, such as a rectangular groove. Wherein when the first accommodating groove 16 and the second accommodating grooves 17 are arranged, a spherical edge can also be arranged on the edges of the ports of the first accommodating groove 16 and the second accommodating grooves 17, so that the finger of the user can easily extend from the spherical edge into the first accommodating groove 16 or the second accommodating grooves 17, so as to facilitate the taking and placing of the required charging connector 6 or wireless charging unit 4.

In addition, in the power adapter of the present application, the circuit board 13 is provided with an MCU; a charging protocol storage module is arranged in the MCU; and a plurality of fast charging protocols are stored in the charging protocol storage module; wherein when the charging connector 6 is connected with a device to be charged, the MCU responds and obtains a fast charging type of the device to be charged, and invokes the corresponding fast charging protocol from the charging protocol storage module according to the fast charging type to quickly charge the device to be charged.

In the present embodiment, the above fast charging protocols stored in the charging protocol storage module can include at least one of the following: QC fast charging protocol, PD fast charging protocol, FCP fast charging protocol, AFC fast charging protocol, SFCP fast charging protocol, APPLE fast charging protocol and SUNSUMG fast charging protocol.

In the above technical solution of the present application, the power adapter can provide real-time judgment of the use condition of the current wireless charging unit 4 and the charging connector 6 for the MCU on the circuit board 13, and allocate the output power of each power supply end according to the specific use condition, as shown in Table 1 below:

Table 1 lists the use condition and the output power relationship of the charging cables 21 of the first telescopic assembly, the second telescopic assembly and the third telescopic assembly of the power adapter of the present application when supplying power respectively.

TABLE 1

| Use condition | Wireless charging unit connected with the first telescopic assembly | type-C charging connector connected with the second telescopic assembly | Lightning charging connector connected with the third telescopic assembly | Total power |
|---|---|---|---|---|
| One charging connector is used alone | 5/0.6 A | / | / | 3 W |
| | / | 30WPD | / | 30 W |
| | / | / | 30WPD | 30 W |
| Two charging connectors are used simultaneously | 5/0.6 A | 30WPD | | 33 W |
| | 5/0.6 A | / | 30WPD | 33 W |
| | / | 5 V/3.0 A | | 15 W |
| Three charging connectors are used simultaneously | 5/0.6 A | 5 V/2.5 A | | 15.5 W |

It can be seen from Table 1 above that in the present embodiment, when the power adapter is used for charging, the following power supply control can be conducted according to the use condition.

(1) When the user only uses the wireless charging unit 4 for charging, the MCU detects that the wireless charging unit 4 works and can specifically control the wireless charging unit to output a constant power of 3 W, that is, output voltage is 5 V and output current is 0.6 A.

(2) When the user uses any one of the charging connectors 6 only to work, the MCU detects that a single charging connector 6 works and the charging connector can output a constant power of 30 W to facilitate the user to quickly charge devices such as a laptop.

(3) When the user uses the wireless charging unit 4 with one charging connector 6 to work at the same time, the MCU detects that one wireless charging unit 4 and one charging connector 6 work, and they can output a constant power of 33 W. At this time, the output voltage of the wireless charging unit 4 is 5 V, the output current is 0.6 A, and the output power is 3 W; and the power output of the charging connector 6 is 30 W.

(4) When the user uses two charging connectors 6 to work at the same time, the MCU detects that the two charging connectors 6 work, and the charging connectors can output a constant power of 15 W. At this time, the output voltage of the two charging connectors 6 is 5 V, the output current is 3 A.

(5) When the user uses the wireless charging unit 4 with two charging connectors 6 to work at the same time, the MCU detects that one wireless charging unit 4 and two charging connectors 6 work, and they can output a constant power of 15.5 W. At this time, the output voltage of the wireless charging unit 4 is 5 V, the output current is 0.6 A, and the output power is 3 W; and the output voltage of the two charging connectors 6 is 5 V and output current is 2.5 A.

It should be noted that the existing power adapter designed with a plurality of charging cables 21 does not have the power distribution problem of the power adapter of the present application, and the output power of each charging cable 21 is constant and low. The power adapter designed in the present application can reasonably adjust the power distribution, which can greatly improve the use safety of the power adapter, and when the single charging connector 6 is used for charging, the charging power of the charging connector 6 can be controlled to reach 30 W to meet the high-power charging need for the devices such as the laptop.

To sum up, the present application designs a new power adapter which can integrate a plurality of telescopic assemblies 2 at the same time to conduct telescopic storage of the charging cables 21 based on the telescopic assemblies 2, so that the charging cables 21 arranged on the plurality of telescopic assemblies 2 can be used to charge the assemblies to be charged. The user can stretch the charging cables 21, so as to simultaneously realize the wired charging of a device to be charged by using the charging connector 6 and the wireless charging of another device to be charged through the wireless charging unit 4, which can greatly meet the diverse charging needs of the user in daily life, and realize good promotion prospects and application value.

In addition, in the present application, a clamping plate 5 that can be detachably connected with the housing 1 is subjected to optimization design. The clamping plate 5 can be specifically arranged in the second through holes 12, and one side of the clamping plate 5 is provided with an avoidance groove 55 which can be enclosed with the inner walls of the second through holes 12 to form a cable outlet hole 7. Based on this design, the problem of large size of the housing 1 when the power adapter is provided with a plurality of telescopic assemblies 2 can be solved, which can reduce the volume size of the housing 1 by 50% to a certain extent, so as to facilitate the carrying and use of the users.

In addition, since the existing power adapter does not have the power distribution problem, the power adapter designed in the present application can control the charging power of the charging connector 6 for wired charging according to the use state of the wireless charging unit 4 and the charging connector 6. Moreover, when only the single charging connector 6 is used for charging, the charging power of the charging connector 6 can be controlled to reach 30 W to meet the high-power charging need for the devices such as the laptop.

The above only describes the embodiments of the present application, and do not limit the scope of the patent in the present application. Any equivalent transformation made by using the contents of the description and the drawings in the present application, or directly or indirectly applied in the relevant technical fields, is similarly included in the protection scope of the patent in the present application.

What is claimed is:

1. A power adapter, comprising a housing and a circuit board arranged in the housing, wherein one side of the housing is provided with a charging plug electrically connected with the circuit board;

at least two telescopic assemblies are also arranged in the housing; the telescopic assemblies are used for telescopic storage of charging cables, and the charging cables are electrically connected with the circuit board, the other side of the housing is provided with a first through hole and at least one second through hole;

the charging cable of one telescopic assembly extends out of the housing from the first through hole and is electrically connected with a wireless charging unit; and the charging cable of at least one telescopic assembly extends out of the housing from the second through hole and is electrically connected with a charging connector.

2. The power adapter according to claim 1, wherein at least two telescopic assemblies are laminated sequentially along the thickness direction of the housing; a limiting groove is arranged in the housing; the telescopic assemblies are arranged in the limiting groove; a side wall of the limiting groove is provided with a positioning convex block extending along the thickness direction of the housing; and outer walls of the telescopic assemblies are provided with positioning grooves matched with the positioning convex block.

3. The power adapter according to claim 1, wherein the other side of the housing is provided with a first accommodating groove and second accommodating grooves arranged in one by one correspondence to the second through holes; the wireless charging unit is arranged in the first accommodating groove; and the charging connector is arranged in the second accommodating grooves.

4. The power adapter according to claim 1, wherein a first telescopic assembly, a second telescopic assembly and a third telescopic assembly are arranged in the housing, and the housing is provided with a first through hole and two second through holes; the charging cable of the first telescopic assembly extends out of the housing from the first through hole and is electrically connected with the wireless charging unit; the charging cable of the second telescopic assembly extends out of the housing from the second through hole and is electrically connected with a type-C charging connector; and the charging cable of the third telescopic assembly extends out of the housing from the other second through hole and is electrically connected with a Lightning charging connector.

5. The power adapter according to claim 1, wherein the circuit board is provided with a micro controller unit (MCU); a charging protocol storage module is arranged in the MCU; and a plurality of fast charging protocols are stored in the charging protocol storage module; when the charging connector is connected with a device to be charged, the MCU responds and obtains a fast charging type of the device to be charged, and invokes the corresponding fast charging protocol from the charging protocol storage module according to the fast charging type to quickly charge the device to be charged.

6. The power adapter according to claim 5, wherein the MCU is used to control the charging power of the charging connector according to the use state of the wireless charging unit and the charging connector; when only the single charging connector is used for charging, the charging power of the charging connector is 30 W.

7. The power adapter according to claim 1, further comprising a clamping plate; wherein the clamping plate is clamped in the second through holes; one side of the clamping plate is provided with an avoidance groove; the avoidance groove and inner walls of the second through holes are enclosed to form a cable outlet hole; and the charging cable extends out of the housing from the cable outlet hole.

8. The power adapter according to claim 7, wherein an outer circumferential surface of one end of the charging cable extending from the housing is provided with a protruding stopper.

9. The power adapter according to claim 7, wherein a magnetic element is arranged on an inner side surface of the clamping plate near the interior of the housing; the charging connector is sleeved with a metal shell; and the magnetic element is used to adsorb the metal shell on the charging connector.

10. The power adapter according to claim 7, wherein the clamping plate comprises a first vertical part, a horizontal part, a bending part and a second vertical part connected successively; the first vertical part and the second vertical part extend along a first direction; the horizontal part extends along a second direction perpendicular to the first direction; the second vertical part is provided with an avoidance groove extending along the second direction and penetrating through the second vertical part; and an inner side surface of the first vertical part near the housing is provided with a buckle element.

* * * * *